(12) United States Patent
Osakabe et al.

(10) Patent No.: US 9,247,087 B2
(45) Date of Patent: Jan. 26, 2016

(54) ELECTRONIC APPARATUS INCLUDING MAIN UNIT AND OPEN/CLOSE UNIT MOVABLE IN UP AND DOWN DIRECTION AND OPENABLE/CLOSEABLE IN ROTATING DIRECTION RELATIVE TO MAIN UNIT

(71) Applicants: Yoshinori Osakabe, Seto (JP); Katsuro Miura, Toyota (JP); Takuya Naniwa, Kiyosu (JP)

(72) Inventors: Yoshinori Osakabe, Seto (JP); Katsuro Miura, Toyota (JP); Takuya Naniwa, Kiyosu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 47 days.

(21) Appl. No.: 14/081,475

(22) Filed: Nov. 15, 2013

(65) Prior Publication Data

US 2014/0139986 A1 May 22, 2014

(30) Foreign Application Priority Data

Nov. 16, 2012 (JP) ................................ 2012-252483

(51) Int. Cl.
*H05K 5/00* (2006.01)
*H04N 1/00* (2006.01)

(52) U.S. Cl.
CPC ................................ *H04N 1/00554* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,051,868 A | * | 9/1991 | Leverault et al. | 361/679.6 |
| 5,253,139 A | * | 10/1993 | Satou | 361/679.09 |
| 5,331,508 A | * | 7/1994 | Hosoi et al. | 361/679.09 |
| 5,394,297 A | * | 2/1995 | Toedter | 361/679.28 |
| 5,784,251 A | * | 7/1998 | Miller et al. | 361/679.6 |
| 6,052,276 A | * | 4/2000 | Do et al. | 361/679.4 |
| 6,125,029 A | * | 9/2000 | Sasaki et al. | 361/679.28 |
| 6,275,376 B1 | * | 8/2001 | Moon | 361/679.06 |
| 6,445,385 B1 | * | 9/2002 | Shin et al. | 345/204 |
| 7,129,931 B2 | * | 10/2006 | Pappas | 345/168 |
| 2002/0080548 A1 | * | 6/2002 | Kato et al. | 361/165 |
| 2003/0193773 A1 | * | 10/2003 | Choi | 361/683 |
| 2005/0007739 A1 | * | 1/2005 | Hata et al. | 361/699 |
| 2005/0128695 A1 | * | 6/2005 | Han | 361/683 |
| 2005/0206667 A1 | * | 9/2005 | Ohama et al. | 347/9 |
| 2006/0256516 A1 | * | 11/2006 | Cho | 361/683 |
| 2007/0058338 A1 | * | 3/2007 | Lee | 361/687 |
| 2007/0146978 A1 | * | 6/2007 | Nakatani et al. | 361/681 |
| 2007/0217133 A1 | * | 9/2007 | Tanaka et al. | 361/681 |
| 2007/0285883 A1 | * | 12/2007 | Nakajima et al. | 361/683 |
| 2007/0291447 A1 | * | 12/2007 | Nakajima et al. | 361/683 |
| 2008/0019085 A1 | * | 1/2008 | Nakajima | 361/680 |
| 2009/0168384 A1 | * | 7/2009 | Goto et al. | 361/803 |
| 2009/0231786 A1 | * | 9/2009 | Takamori et al. | 361/679.01 |
| 2011/0075226 A1 | * | 3/2011 | Fujiwara | 358/474 |
| 2011/0235140 A1 | | 9/2011 | Ito et al. | |
| 2013/0107334 A1 | * | 5/2013 | Miura et al. | 358/498 |

FOREIGN PATENT DOCUMENTS

JP 2011-205341 A 10/2011

* cited by examiner

*Primary Examiner* — Lisa Lea Edmonds
(74) *Attorney, Agent, or Firm* — Banner & Witcoff, Ltd.

(57) ABSTRACT

When a document cover in a closed position is opened, a lower end of a rear cover of the document cover may horizontally push a hung portion of an electric cable inside an image reading apparatus. If a rectangular edge of the lower end contacts the horizontal portion directly, the electric cable containing the horizontal portion may be damaged. Therefore, arc-like projections are formed on the lower end of the rear cover such that the projections contact the horizontal portion. According to this configuration, the damage of the electric cable can be suppressed.

4 Claims, 8 Drawing Sheets

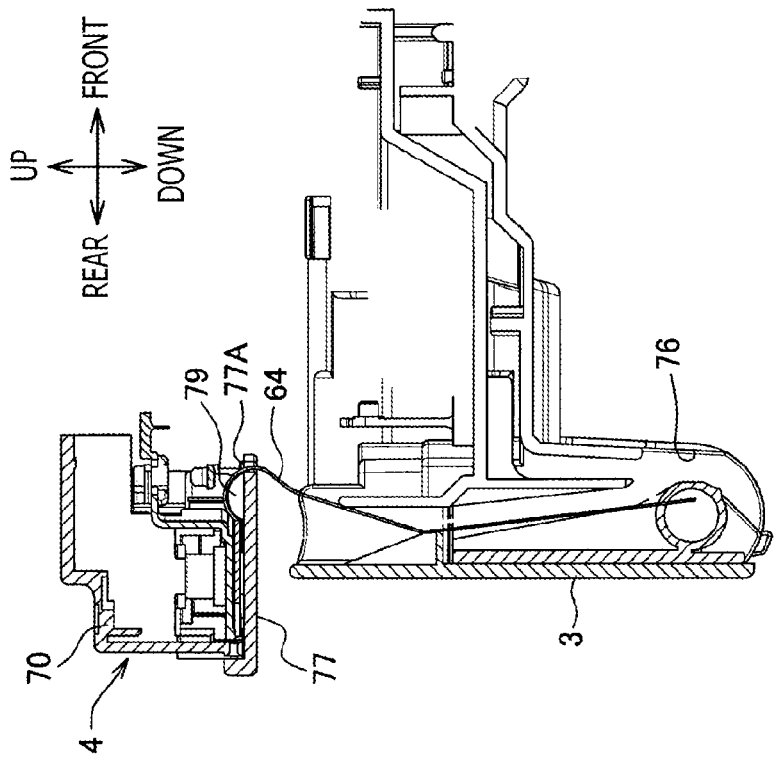
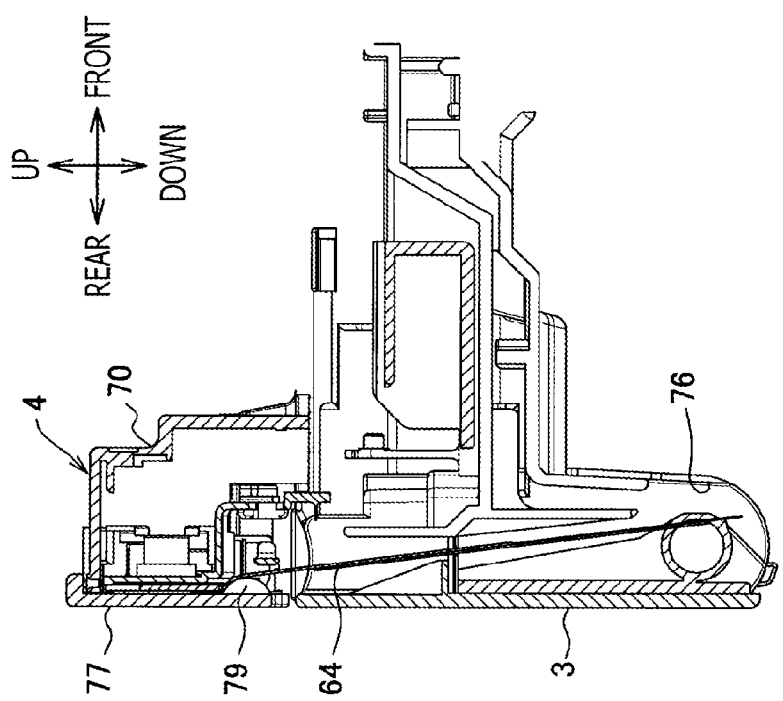

ELECTRONIC APPARATUS INCLUDING MAIN UNIT AND OPEN/CLOSE UNIT MOVABLE IN UP AND DOWN DIRECTION AND OPENABLE/CLOSEABLE IN ROTATING DIRECTION RELATIVE TO MAIN UNIT

CROSS-REFERENCE TO RELATED APPLICATION

This application claims priority under 35 U.S.C. §119 from Japanese Patent Applications No. 2012-252483 filed on Nov. 16, 2012. The entire subject matter of the application is incorporated herein by reference.

BACKGROUND

1. Technical Field

An aspect of the present invention relates to an electronic apparatus such as an image reading apparatus configured to read an image from a sheet of original document. Specifically, the aspect of the present invention relates to an electronic apparatus including a main unit and an open/close unit. The open/close unit movable in an up and down direction, is openable (and closeable) in a rotating direction with respect to the main unit and includes a device which is connected with an electric cable.

2. Related Art

Conventionally, there has been suggested an image reading apparatus, which typically includes a platen disposed on top of a main unit, a main side reader unit inside the main unit, and a processing unit which is also accommodated inside the main unit. On the platen, an original document to be read by the main unit side reader unit is placed. A signal outputted by the main unit side reader unit is processed by the processing unit. There has also been suggested an image reading apparatus further including an open/close unit provided with a conveyance unit to convey original documents and an open/close unit side reader unit. The open/close unit is configured to openable (and closeable) with respect to the main unit. As the original document is conveyed by the conveyance unit, one side of the original document is read by the main unit side reader unit, while the other side (i.e., a reverse side) of the original document is read by the open/close unit side reader unit. According to this configuration, the image reading apparatus may read the images from both sides of the original document while the original document is conveyed only once.

SUMMARY

In the conventional image reading apparatus, a signal outputted by the open/close unit side reader unit is transmitted to the processing unit, which is accommodated in the main unit, with an electric cable. The electric cable is hung from an inner surface of a side wall, which is parallel to and in the vicinity of a rotation shaft of a casing of the open/close unit, inserted inside the main unit, and connected to the processing unit. According to this configuration, when the rotation shaft of the open/close unit is not provided at an appropriate position, a lower edge of the side wall of the open/close unit may horizontally push the electric cable inside the image reading apparatus when the open/close unit in a close state is opened. This may cause damage on the electric cable. Therefore, in the conventional image reading apparatus, there is less designing flexibility regarding an arrangement of the rotation shaft of the open/close unit.

Aspects of the present invention provides an improved electronic apparatus, in which damage of an electric cable which may occur when a casing of an open/close unit in a close state is opened can be suppressed irrespective of a position of a rotation shaft of the open/close unit.

According to aspects of the present invention, an electronic apparatus including a main unit, an open/close unit including a casing having side walls and configured to rotate between a closed position in which an upper surface of the main unit is covered and an open position in which the upper surface of the main unit is exposed, a hinge unit configured to support the open/close unit rotatably with respect to the main unit, a first electronic unit disposed in the open/close unit and connected to one end of an electric cable, a second electronic unit disposed in the main unit and connected to the other end of the electric cable, and at least one projection formed on an inner surface of one of the side walls of the casing of the open/close unit is provided. The at least one projection projects from a lower end of the side wall toward inside the open/close unit, and contacts the electric cable at least when the open/close unit is in the closed position.

BRIEF DESCRIPTION OF THE ACCOMPANYING DRAWINGS

FIGS. 8A and 8B are illustrative views explaining a function of the rear cover.

DETAILED DESCRIPTION

Hereinafter, an embodiment according to aspects of the invention will be described with reference to the accompany drawings. An multifunction device (hereinafter, referred to as "MFD") 1 according to an embodiment of the present invention is equipped with a plurality of functions including a function as an image reading apparatus (i.e., a scanning function) and other functions (e.g., a printing function, a copying function and a facsimile transmission/receiving function).

In the embodiment described below, directions concerning the MFD 1 and positional relationships among components of the MFD 1 will be referred to based on orientations indicated by arrows shown in each drawing. In this regard, a right-to-left or left-to-right direction of the MFD 1 may be referred to as a right-left direction. An up-to-down or down-to-up direction may be referred to as an up-down direction. The front-to-rear or rear-to-front direction may be referred to as a front-rear direction.

Figures 1A, 1B:
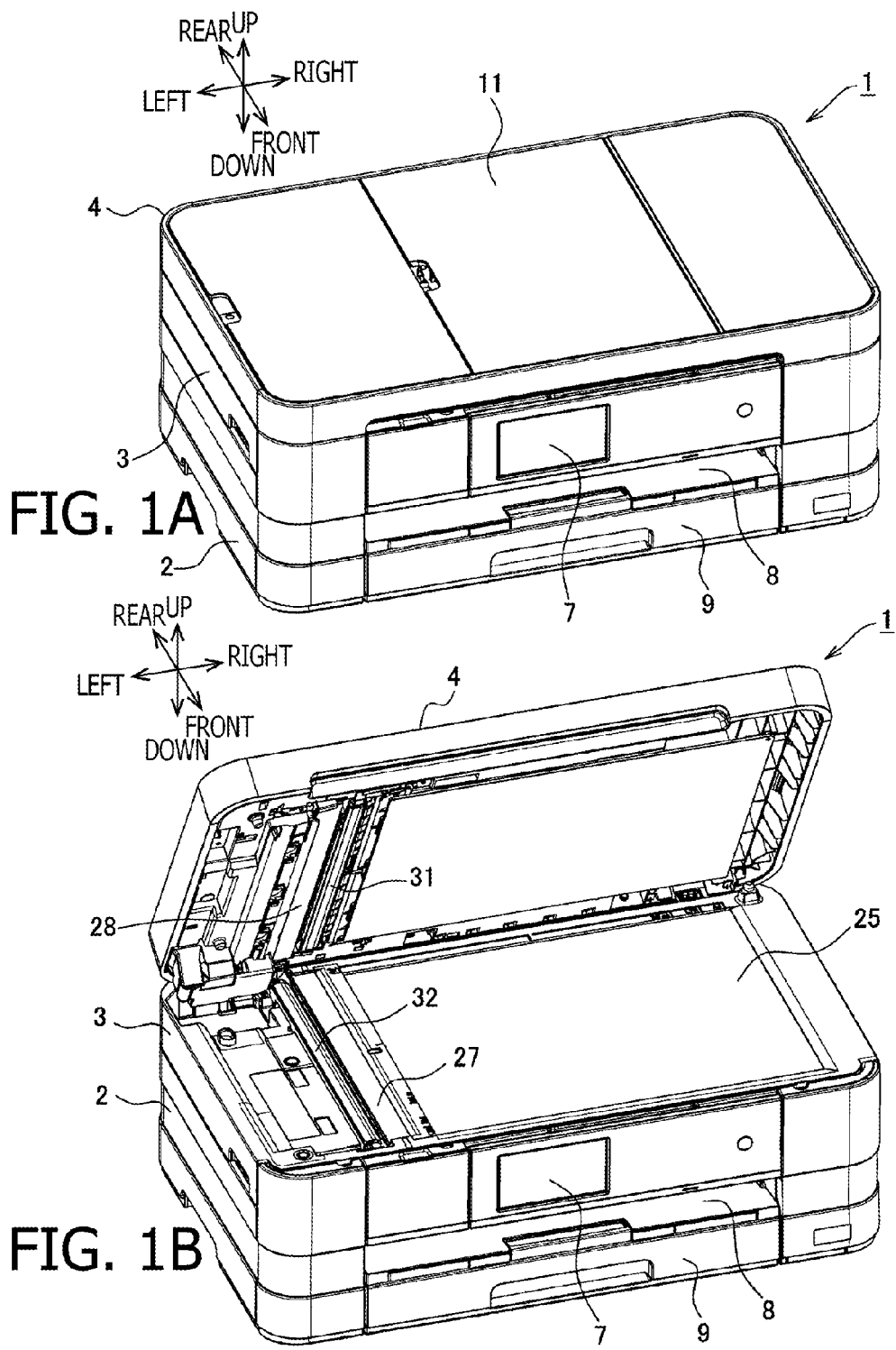
FIGS. 1A and 1B are perspective views showing a multifunction device according to an embodiment of the present invention, when a document cover is closed (FIG. 1A) and opened (FIG. 1B).

As depicted in FIG. 1A, the MFD 1 includes an image forming unit 2, an image reader unit 3 and a document cover 4. The image reader unit 3 is arranged in an upper position with respect to the image forming unit 2. The document cover 4 is arranged in an upper position with respect to the image reader unit 3. As depicted in FIG. 1B, the document cover 4 is configured to rotate, with hinges 10 (see FIG. 5), about an axis defined in the vicinity of a rear side of an upper surface of the image reader unit 3. The document cover 4 is openable and closable (i.e., movable between an open position shown in FIG. 1A and a closed position shown in FIG. 1B). The image reader unit 3 is configured to rotate about an axis defined in the vicinity of a rear side of an upper surface of the image forming unit 2. The image reader unit 3 is configured to be openable and closable, that is, movable between a closed position as shown in FIG. 1A, in which the upper surface of the image forming unit 2 is covered with the image reader unit 3, and an open position (not shown) in which the upper surface of the image forming unit 2 is exposed.

The image forming unit 2 includes components such as a printer engine (not shown), a processing unit 100 (see FIG. 4) and etc. Each component included in the image forming unit 2, the image reader unit 3 and the document cover 4 is controlled by the processing unit 100 of the image forming unit 2.

When the document cover 4 is moved from the closed position to the open position, a platen (i.e., an upper surface of a transparent portion 25 described later) arranged on the top of the image reader unit 3 is exposed as depicted in FIG. 1B. When the document cover 4 is moved from the open position to the closed position, the platen is covered by the document cover 4 as depicted in FIG. 1A.

An operation panel 7 to be operated by a user is disposed on an upper front side of the image forming unit 2. Additionally, a printed sheet outlet 8, through which a printed medium is ejected, is formed below the operation panel 7. Further, a sheet-feed cassette 9 is arranged below the printed sheet outlet 8. In other words, the printed sheet outlet 8 is arranged between the operation panel 7 and the sheet-feed cassette 9.

Figure 2:
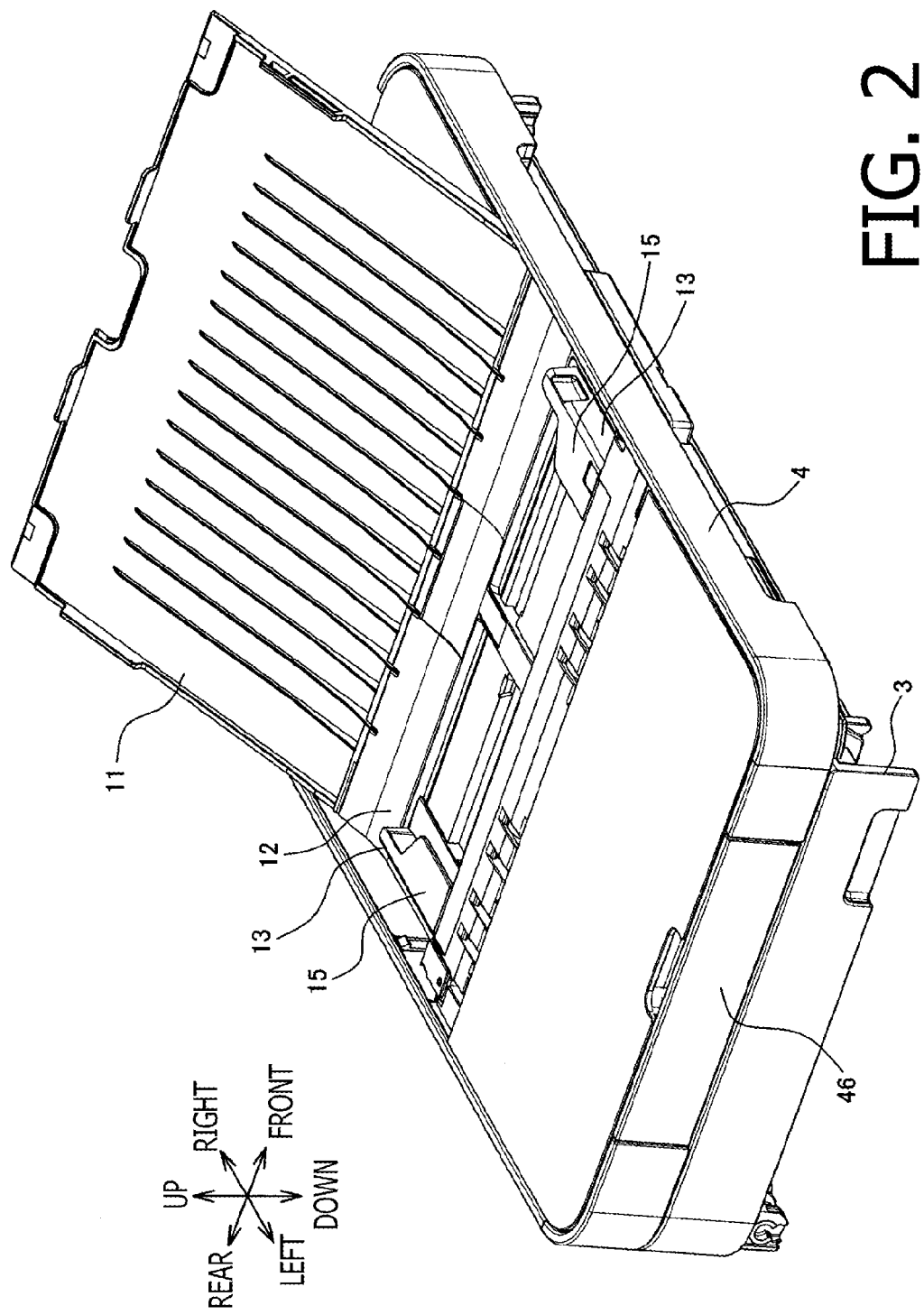
FIG. 2 is a perspective view showing an image reader unit of the multifunction device with a feeding unit of the image reader unit being in use.

As depicted in FIG. 1A and FIG. 2, an upper cover 11, which is openable/closeable with respect to the document cover 4, is disposed on top of the document cover 4. The upper cover 11 is configured to be rotatable about an axis, which is defined at a position in the vicinity of a right end of the upper cover 11 and extends in the front-rear direction. When the upper cover 11 is in the closed position, a bottom surface of the upper cover 11 is directed downward as depicted in FIG. 1A. When the upper cover 11 is rotated from the closed position to the open position by the user, the bottom surface of the upper cover 11 is directed obliquely to an upper right direction as depicted in FIG. 2. In this state, a document tray 12 on the top of the document cover 4 is exposed to outside.

On the document tray 12, a pair of document guiding pieces 13, which guide the original document in the right-left direction by holding the original document in the front-rear direction, are disposed. The pair of document guiding pieces 13 have well know configurations so that they can slide in the front-rear direction in conjunction with each other. Specifically, when one of the document guiding pieces 13 slides in one direction, another document guiding piece 13 slides in a direction opposite to the one direction. According to this configuration, the user can slide the pair of document guiding pieces 13 to be closer to and farther from each other by operating one of the document guiding pieces 13 so as to change an interval therebetween.

A partition plate 15 is disposed on an upper end of the document guiding pieces 13. The original document to be read is set below the partition plate 15. The original document is then fed and conveyed along a document conveyer path as described later, and ejected above the partition plate 15.

Details of Image Reader Unit and Document Cover

Figure 3:
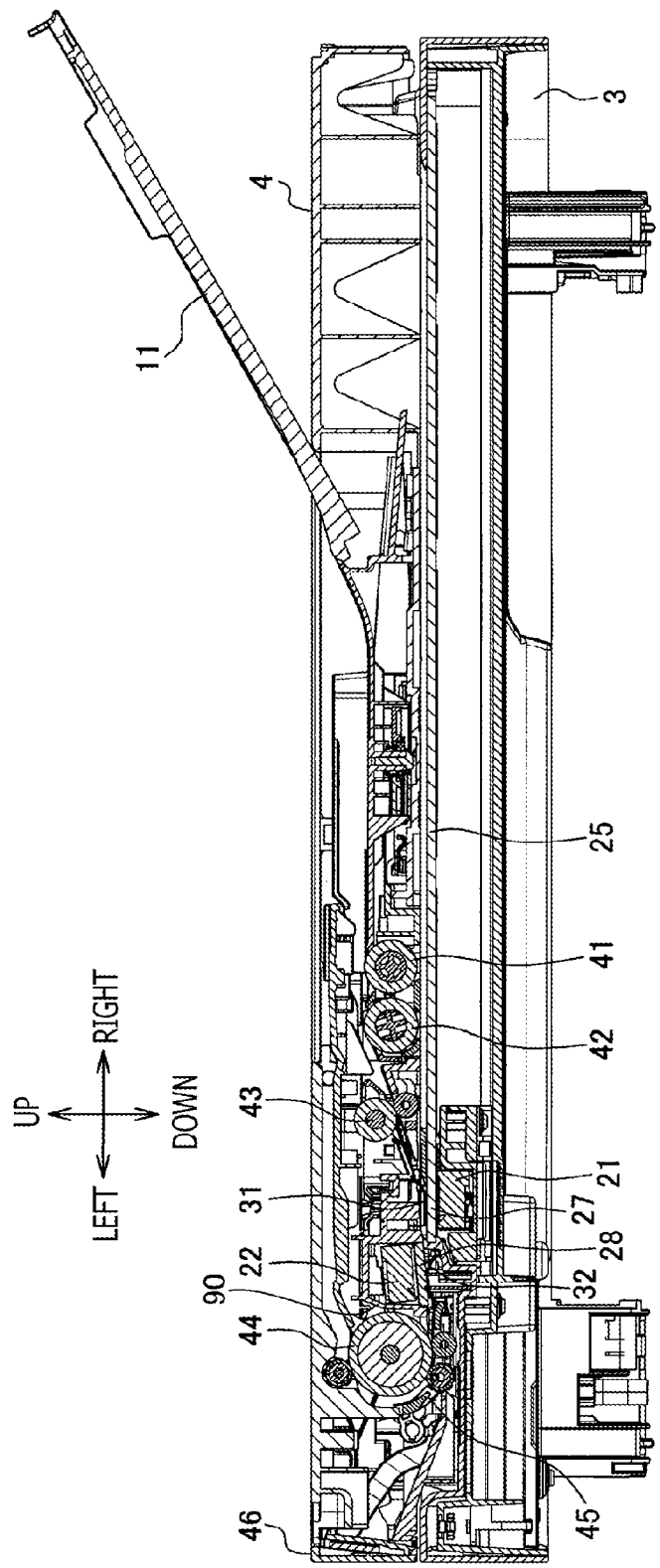
FIG. 3 is a cross-sectional side view showing a configuration of the image reader unit.

FIG. 3 is a center cross-sectional side view of the image reader unit 3 and the document cover 4 with the document cover 4 being in the closed position with respect to the image reader unit 3 and the upper cover 11 being in the open position with respect to the document cover 4. That is, FIG. 3 is a view showing a cross-sectional surface viewed from a front side and sectioned along the right-left direction at substantially a center of the image reader unit 3 and the document cover 4 shown in FIG. 2. As depicted in FIG. 3, the image reader unit 3 includes a first image sensor 21 and the document cover 4 includes a second image sensor 22. In the present embodiment, contact image sensors are employed to serve as the first image sensor 21 and the second image sensor 22.

The first image sensor 21 is driven by a motor (not shown) to reciprocate inside the image reader unit 3 in the right-left direction (i.e., a sub scanning direction). On the other hand, the second image sensor 22 is fixed on a frame of the document cover 4.

The transparent portion 25 and a first transparent portion 27 are disposed above a reciprocating path of the first image sensor 21 of the image reader unit 3. In addition, a second transparent portion 28 is disposed below the second image sensor 22 of the document cover 4.

The transparent portion 25 and the first transparent portion 27 are arranged to form the upper surface of the image reader unit 3. In the present embodiment, the transparent portion 25 and the first transparent portion 27 are formed by a single glass plate. Additionally, in the present embodiment, the second transparent portion 28 is formed by a glass plate separately from the transparent portion 25 and the first transparent portion 27 (see FIG. 1B).

As depicted in FIG. 1B, the document cover 4 includes a first white reference plate 31. The first white reference plate 31 is disposed to face the first transparent portion 27 of the image reader unit 3 when the document cover 4 is in the closed position with respect to the image reader unit 3 as depicted in FIG. 1A. The first white reference plate 31 is used when the first image sensor 21 performs a shading correction. Additionally, the image reader unit 3 includes a second white reference plate 32. The second white reference plate 32 is disposed to face the second transparent portion 28 of the document cover 4 when the document cover 4 is in the closed position with respect to the image reader unit 3 as depicted in FIG. 1A. The second white reference plate 32 is used when the second image sensor 22 performs a shading correction.

It is noted that the transparent portion 25 and the first transparent portion 27 may be formed by separate glass plates instead of the single glass plate. Further, the transparent portion 25, the first transparent portion 27 and the second transparent portion 28 may be made of any materials other than glass providing that the original document can be read by the first image sensor 21 and the second image sensor 22.

As depicted in FIG. 3, the document cover 4 includes rollers such as a feed roller 41, a separator roller 42, a conveyer roller 43 and a reverse conveyer roller 44. Additionally, members having guiding faces to guide the original document to an appropriate conveying direction are disposed between the rollers. As one of the members having the guiding faces, a path switching member 45 which is movable and disposed on a left side of the reverse conveyer roller 44 is provided.

The path switching member 45 is movable, with respect to the document cover 4, to rotate about an axis extending in the front-rear direction on the lower end side of the path switching member 45. Additionally, an openable and closeable cover 46 is disposed on an outer surface of the document cover 4 on the left side of the reverse conveyer roller 44.

In the present embodiment, an image formed on the original document will be read as described below while the original document is conveyed in the document cover 4. Specifically, when the rollers included in the document cover 4 are driven, the original documents fed by the feed roller 41 from an upstream side in the conveying direction are separated one-by-one by the separator roller 42, and conveyed to a downstream side in the conveying direction.

Subsequently, the original document is further conveyed by the conveyer roller 43 to the downstream side in the conveying direction, and passes through a first reading position which faces the first image sensor 21 across the first transparent portion 27. Then, the original document passes through a second reading position which faces the second image sensor 22 across the second transparent portion 28 and is further conveyed by the reverse conveyer roller 44.

In this regard, if the path switching member 45 and the cover 46 are positioned as shown in FIG. 3, the original document is reversed and conveyed by the path switching member 45, and ejected above the partition plate 15. On the other hand, if the path switching member 45 and the cover 46 are moved to rotate from the position shown in FIG. 3 in a counterclockwise direction, the original document is ejected to the left side of the document cover 4 directly (so-called a straight ejection). The straight ejection is used when the original document is a thicker paper such as a business card or a post card. It is noted that the cover 46 is not shown in FIGS. 1A and 1B.

Further, if reading of an image from one side of the original document is designated, the image of the original document which passes through the first reading position is read by the first image sensor 21 during the conveyance of the original document. On the other hand, if reading of images from both sides of the original document is designated, the images formed on both sides of the original document which pass through the first reading position and the second reading direction are respectively read, in parallel operation, by the first image sensor 21 and the second image sensor 22 during the conveyance of the original document.

Arrangement of Image Sensor and Electric Cable

According to the embodiment, by employing the same sensor for both the first image sensor 21 and the second image sensor 22, a manufacturing cost is suppressed. When the same contact image sensors are used, a positional relationship between an array of a plurality of imaging elements of the sensor, a light emitting unit and components such as a connecter is the same between the first image sensor 21 and the second image sensor 22. It is noted that, the array of imaging elements constitutes the sensor, the light emitting unit is arranged in parallel with the array of imaging elements, and the connecter is disposed at one end portion of the array of imaging elements and outputs signals from the imaging elements.

Since the same sensors are used, when the first image sensor 21 and the second image sensor 22 are arranged to face opposite sides of the original document with longer sides (i.e., a main scanning direction) thereof being aligned in the front-rear direction as described above, an arrangement order of the array of the imaging elements and the light emitting unit in the document conveying direction is reversed or the connectors of the first image sensor 21 and the second image sensor 22 are located at opposite side ends in the front-rear direction.

Specifically, when the first image sensor 21 and the second image sensor 22 are arranged to face each other such that the arrangement order of the array of the imaging elements and the light emitting unit of the first image sensor 21 in the document conveying direction is the same as that of the second image sensor 22, the connectors of the first image sensor 21 and the second image sensor 22 are located on opposite side ends in the longitudinal direction thereof. In this regard, a state where the arrangement order of the array of the imaging elements and the light emitting unit of the first image sensor 21 and that of the second image sensor 22 in the document conveying direction is the same means a positional relationship of the array of the imaging elements and the light emitting unit of the first image sensor 21 in the right-left direction is the same as the positional relationship of the array of the imaging elements and the light emitting unit of the second image sensor 22 in the right-left direction.

On the other hand, when the first image sensor 21 and the second image sensor 22 are arranged such that the connectors thereof are located on the same side ends in the longitudinal direction of the first image sensor 21 and the second image sensor 22, the arrangement order of the array of imaging elements and the light emitting unit, in the document conveying direction, of the first image sensor 21 is reversed with respect to that of the second image sensor 22. In other words, when the same sensors are used as the first image sensor 21 and the second image sensor 22 and they are arranged to face each other with the conveyer path located therebetween, the arrangement order of the array of the imaging elements and the light emitting unit in the document conveying direction, or the position of the connector in the longitudinal direction is reversed between the first image sensor 21 and the second image sensor 22. It is noted that the longitudinal direction of the first image sensor 21 and the second image sensor 22 is a direction orthogonal to the document conveying direction and parallel to a surface of the original document to be conveyed.

If the arrangement orders of the array of the imaging elements and the light emitting unit in the document conveying direction are reversed between the first image sensor 21 and the second image sensor 22, there is a problem that it is difficult to detect a leading end and a trailing end of the original document. Specifically, when the arrangement orders are reversed, the imaging elements of one of the first image sensor 21 and the second image sensor 22 receives reflected light which is reflection of light emitted from the upstream side to the downstream side in the document conveying direction, while, the imaging elements of the other one of the first image sensor 21 and the second image sensor 22 receives reflected light which is reflection of light emitted from the downstream side to the upstream side in the document conveying direction. As a result, different positions are detected as an end of the original document by the first image sensor 21 and the second image sensor 22. Thus, the precise detection of the leading end and the trailing end of the original document becomes difficult. This problem is particularly significant when a document subject to scanning is thick.

Figure 4:
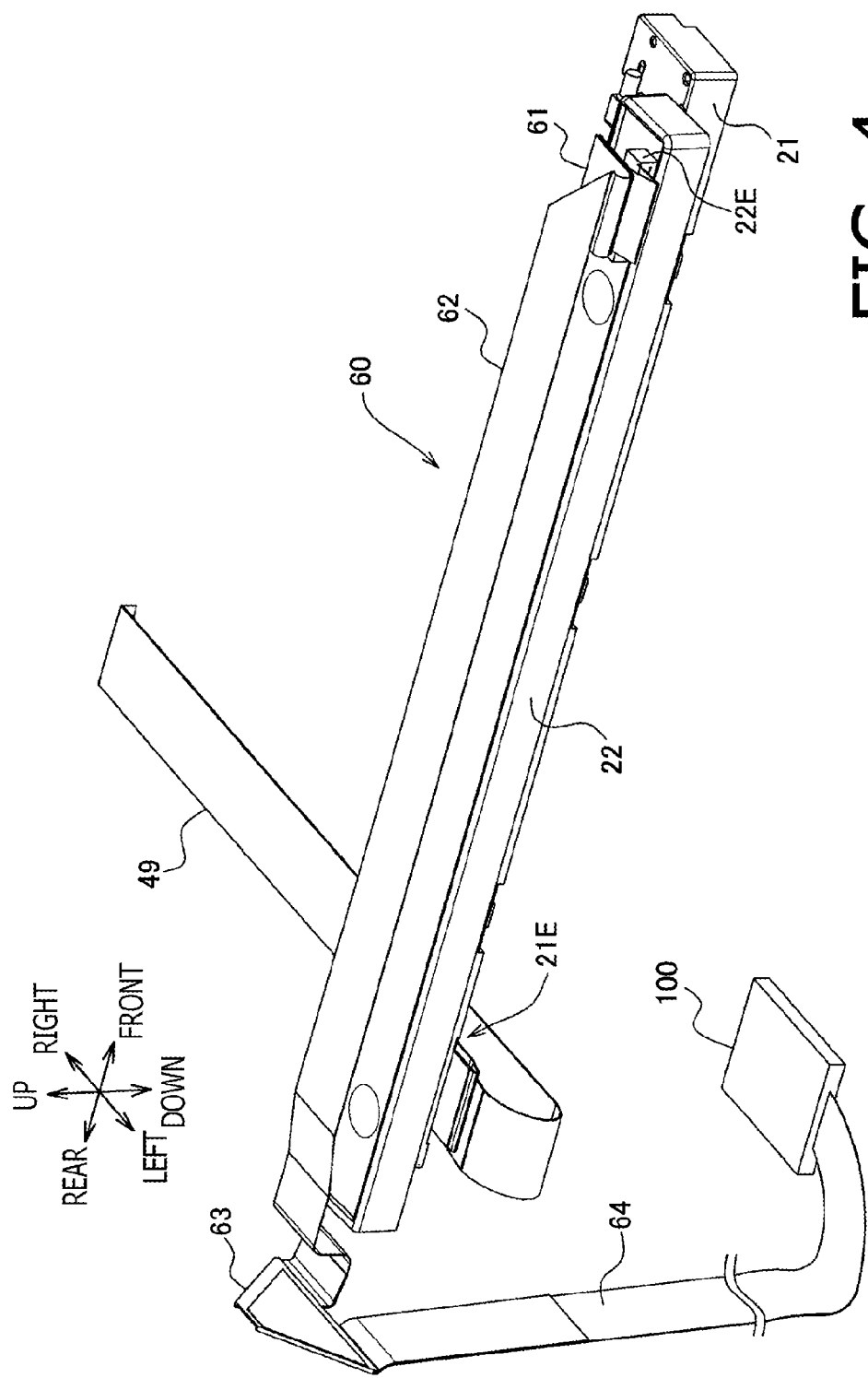
FIG. 4 is a perspective view showing an arrangement of electric cables and image sensors in the image reader unit.

In view of the above problem, in order to arrange the first and second image sensors 21 and 22 with making the arrangement orders of the array of the imaging elements and the light emitting unit of the first image sensor 21 and that of the second image sensor 22 coincide with each other, the first image sensor 21 is arranged such that a connector 21E is located on the rear side and the second image sensor 22 is arranged such that a connector 22E is located on the front side as depicted in FIG. 4.

According to the embodiment, the connector 21E and the connector 22E are respectively connected with electric cables 49 and 60 (e.g., flexible flat cables). The electric cables 49 and 60 are connected to the processing unit 100 of the image forming unit 2 passing through vicinity of the hinges 10. Although not shown in FIG. 4, the electric cable 49 connected to the connector 21E on the rear side of the first image sensor 21 extends along a movable range of the first image sensor 21 of the image reader unit 3, and is connected to the image forming unit 2.

The electric cable 60 connected with the second image sensor 22E on the front side of the second image sensor 22 extends to across above the second image sensor 22 in the front-rear direction and is connected to the image forming unit 2 passing through the vicinity of the hinges 10 on the left side.

Hereinafter, an arrangement of the electric cable will be described in detail. As depicted in FIG. 4, the electric cable 60 includes an end portion 61 which is connected with the connector 22E and folded to form an accordion portion above the connector 22E. When the document cover 4 is in the open position as depicted in FIG. 1B, an operator, such as a service person, may remove the second transparent portion 28 and take out the second image sensor 22 with unfolding the end portion 61. According to this configuration, the service person may replace the second image sensor 22 easily.

Returning to FIG. 4, the electric cable 60 includes a horizontal portion 62, which is connected with the end portion 61 and horizontally extends, in the front-rear direction, above the second image sensor 22. The horizontal portion 62 is supported by an upper surface of a casing 90 (see FIG. 3) which accommodates the second image sensor 22. A portion of the electric cable 60 connected with a rear end of the horizontal portion 62 is folded perpendicularly twice to form a trapezoidal folding back portion 63. The electric cable 60 further includes a hung portion 61 which extends from the folding back portion 63 to the processing unit 100 and is drooped towards the image reader unit 3.

Figure 5:
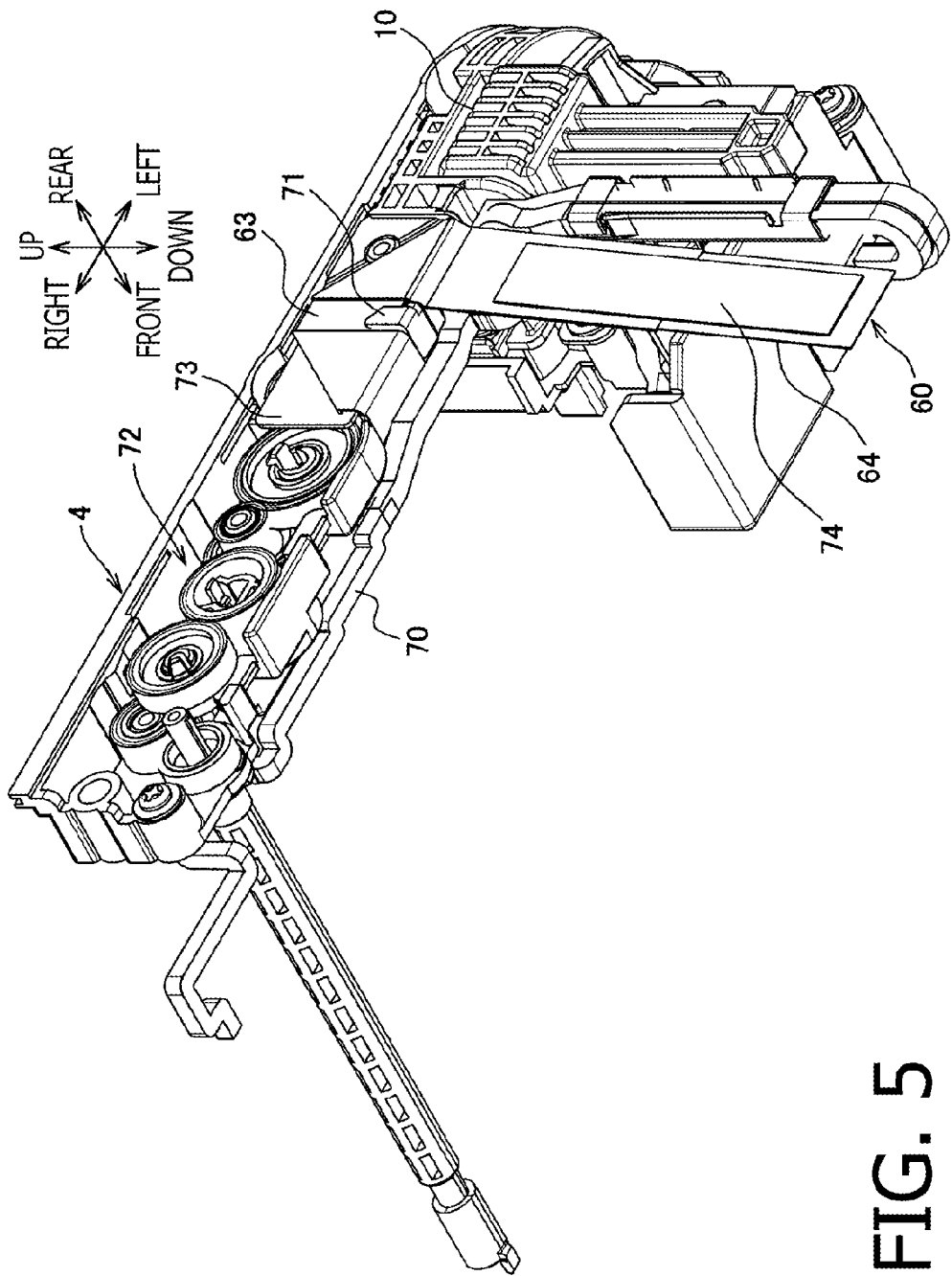
FIG. 5 is a perspective view showing the arrangement of the electric cable in a rear side of the image reader unit.

As depicted in FIG. 5, the folding back portion 63 is arranged on the rear side of a rear end frame 70 of the document cover 4 and hooked on a hook 71 formed on the rear end frame 70. The rear end frame 70 rotatably supports a chain of gears 72 which transmit driving force to the rollers such as the reverse conveyer roller 44. On a surface of the folding back portion 63 facing the chain of gears 72, a protection plate 73 (e.g., a resin film such as PET) is attached with a two-sided adhesive tape (not shown). The protection plate 73 prevents the electric cable 60 from contacting the chain of gears 72. Additionally, to the hung portion 64, an attaching member 74 (e.g., a resin film such as PET) is attached at a position slightly displaced from a connected portion with the folding back portion 63.

Figure 6A:
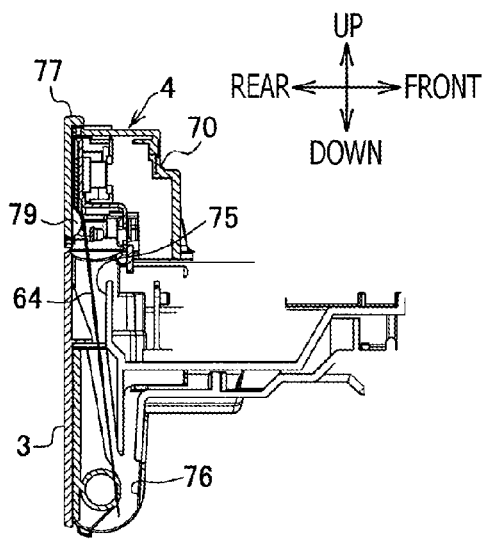
FIGS. 6A-6D are illustrative views explaining a function of an attaching member on the electric cable.
Figure 6B:
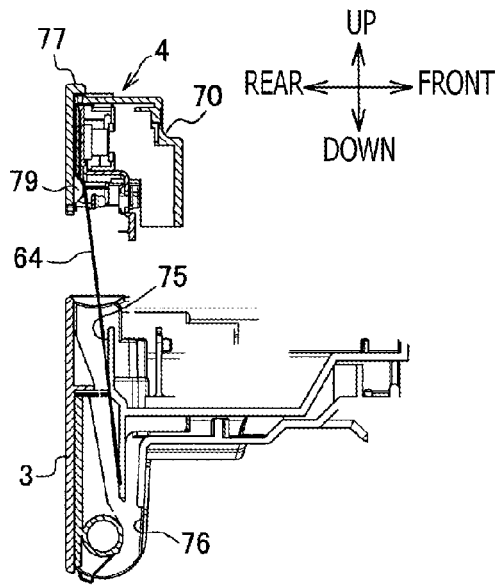

The hinges 10 are movable with respect to the image reader unit 3 in the front-rear direction and rotatably supports the document cover 4. According to this configuration, the document cover 4 may press the original document such as a single paper placed on the transparent portion 25 when it moves down with the hinges 10 to a down position as depicted in FIG. 6A. Additionally, as depicted in FIG. 6B, the document cover 4 moves up with the hinges 10 to an upper position so that the document cover 4 may press the original document such as a book loaded on the transparent portion 25, which is relatively thick in the up and down direction.

Figure 6C:
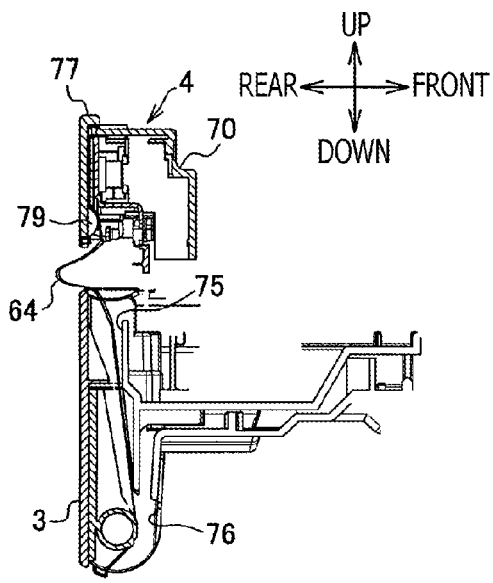
Figure 6D:
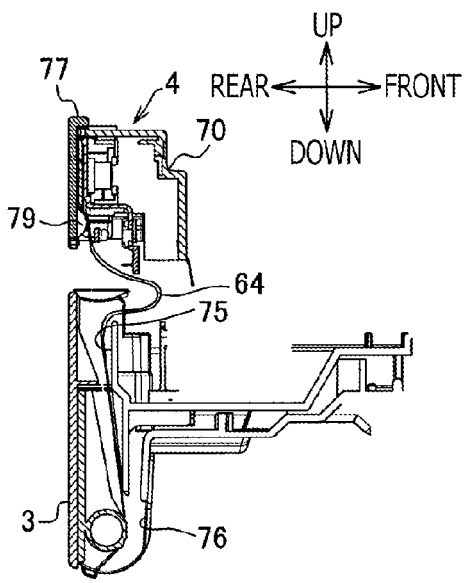

The attaching member 74 functions as described below. As depicted in FIGS. 6A and 6B, the hung portion 64 is inserted into a space 76 inside the image reader unit 3 through an opening 75 formed on an upper rear end of the image reader unit 3. The space 76 has volume to receive the hung portion 64 when the document cover 4 moves from the upper position to the down position. In this regard, as depicted in FIG. 6C or 6D, if the attaching member 74 is not attached to the hung portion 64, the hung portion 64 bends between the image reader unit 3 and the document cover 4 when the document cover 4 moves from the upper position to the down position. In such case, the bended part of the hung portion 64 might be nipped between the image reader unit 3 and the document cover 4 and damage of the electric cable 60 may be caused.

In contrast, in the present embodiment, the attaching member 74 having a low friction coefficient is attached to the hung portion 64 so that the hung portion 64 may be inserted into and removed from the opening 75 smoothly. Additionally, the attaching member 74 has a predetermined length and a certain amount of stiffness. Thus, the attaching member 74 may strengthen a part of the hung portion 64 which contacts the opening 74 so as not to bend easily. Therefore, bending of the hung portion 64 between the image reader unit 3 and the document cover 4 may be suppressed, and the hung portion 64 is prevented from nipping between the image reader unit 3 and the document cover 4. This may result reducing the probability of damage of the hung portion 64.

Figure 7:
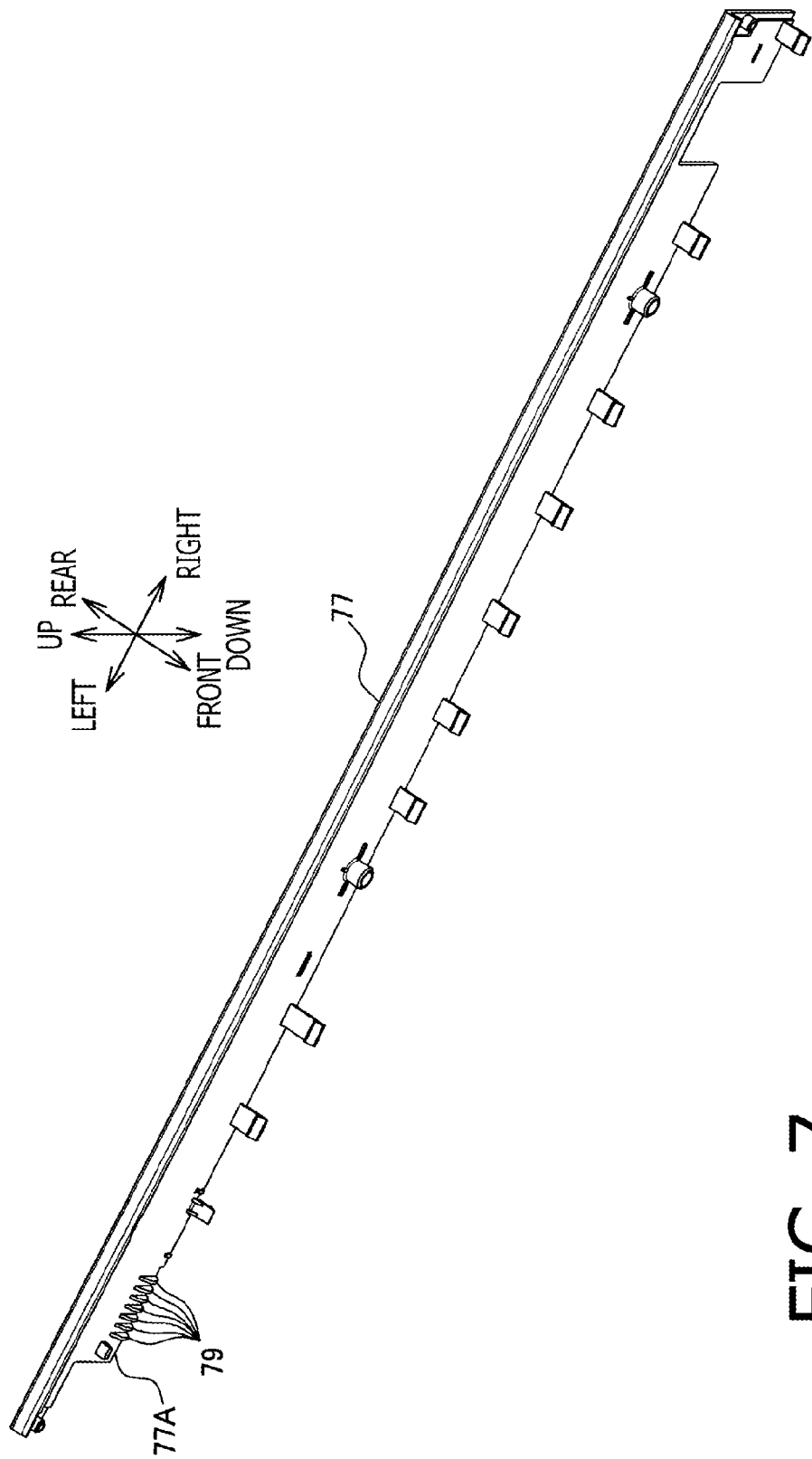
FIG. 7 is a perspective view showing a configuration of a rear cover of the image reader unit.

Further, as depicted in FIGS. 6A-6D, a rear cover 77 is disposed on a rear side of the rear end frame 70 of the document cover 4 and a part of the electric cable 60 is disposed between the rear cover 77 and the rear end frame 70. As depicted in FIG. 7, a plurality of projections 79 (e.g., seven projections in the embodiment shown in FIG. 7) are formed on a front surface of the rear cover 77. Each projection 79 is an arc-like plate member projecting towards inside the document cover 4. The projections 79 are formed to contact the hung portion 64 on which the attaching member 74 is not attached. The projections 79 equally contact the electric cable 60 over the width direction (i.e., the right-left direction) of the electric cable 60. Further, a lower end 77A of the each projection 79 reaches the lower end of the rear cover 77.

When the document cover 4 is rotated from the closed position shown in FIG. 8A to the open position shown in FIG. 8B, the lower end 77A of the rear cover 77 might push the hung portion 64 inside the MFD 1 in the horizontal direction depending on a position of the rotation shaft of the document cover 4. In this case, if a rectangular edge of the lower end 77A directly contacts the hung portion 64, the hung portion 64 which is a part of the electric cable 60 might be damaged. In contrast, according to the MFD 1 in the embodiment, the arc-like projections 79 formed on the lower end 77A contact the hung portion 64 when the document cover 4 is rotated from the closed position to the open position. Therefore, the rectangular edge of the lower end 77A does not directly contact the hung portion 64 and the damage of the electric cable 60 can be suppressed. As a result, designing flexibility regarding an arrangement of the rotation shaft of the document cover 4 can be increased in the present embodiment.

Additionally, if the projections 79 contact a part of the electric cable 60 on which the attaching member 74 is attached, such a part of the electric cable 60 is hardly bend along the arch-like projections 79 even when it contacts the projections 79. In this case, the damage of the electric cable 60 might not be suppressed by the projections 79 in an efficient manner. In contrast, in the present embodiment, the projections 79 are disposed so that a part of the electric cable 60, on which the attaching member 74 is not attached, contacts the projections 79. Therefore, the electric cable 60 may bend easily along the projections 79 and the damage of the electric cable 60 can be suppressed steadily by the projections 79.

Further, in the present embodiment, the folding back portion 63 arranged in an upper position of the part of the electric cable 60 which contacts the projections 79 is fixedly attached to the rear end frame 70. Therefore, a position of the folding back portion 63 of the electric cable 60 in the document cover 4 does not change when the document cover 4 rotates.

According to this configuration, the operations of the components disposed inside the document cover 4 can be stabilized.

Only an exemplary embodiment of the disclosure and a few examples of their versatility are shown and described in the disclosure. It is to be understood that the disclosure is capable of use in various other combinations and environments and is capable of changes or modifications within the scope of the inventive concept as expressed herein. For example, the projections may be a semicircular column like projection having an arc-like cross-sectional surface and extending in a predetermined length. Additionally, the electric cable is not limited to the flexible flat cable but also various types of electric cables can be used. Further, any devices which need to be connected with the electric cable can be included in the document cover 4 instead of the second image sensor 22. For example, a driving source such as a motor or any other electric devices which is driven or controlled by an electrical signal may be applicable. Additionally, the present invention may be applicable to any electronic apparatuses including a main unit and an open/close unit which is movable (openable) with respect to the main unit and includes a device which is connected with an electric cable.

What is claimed is:

1. An electronic apparatus comprising:
   a main unit;
   an open/close unit including a casing having side walls and configured to rotate between a closed position in which an upper surface of the main unit is covered and an open position in which the upper surface of the main unit is exposed;
   a hinge unit configured to support the open/close unit rotatably with respect to the main unit, the hinge unit being attached to one of the side walls;
   a first electronic unit disposed in the open/close unit and connected to one end of an electric cable;
   a second electronic unit disposed in the main unit and connected to the other end of the electric cable; and
   at least one projection formed on an inner surface of the one of the side walls of the casing of the open/close unit,
   wherein the at least one projection, when the open/close unit is in the closed position, projecting from a lower end of the one of the side walls toward inside the open/close unit,
   wherein the at least one projection contacts the electric cable at least when the open/close unit is in the open position,
   wherein the at least one projection includes a curved surface directed to an edge of the lower end, and
   wherein the electric cable contacts the curved surface.

2. The electronic apparatus according to claim 1, wherein the hinge unit is configured such that the open/close unit is movable with respect to the main unit in an up and down direction.

3. The electronic apparatus according to claim 1, wherein,
   the electric cable includes a first portion on which an attaching member is attached and a second portion above the first portion on which the attaching member is not attached, and
   the projection contacts the second portion of the electric cable.

4. The electronic apparatus according to claim 3, wherein,
   the electric cable further includes a third portion which is fixed to the casing of the open/close unit, and
   the second portion is located between the first portion and the third portion.

\* \* \* \* \*